W. M. REYNOLDS.
AUTOMOBILE FAN BELT TIGHTENER.
APPLICATION FILED SEPT. 7, 1916.
1,238,822.
Patented Sept. 4, 1917.
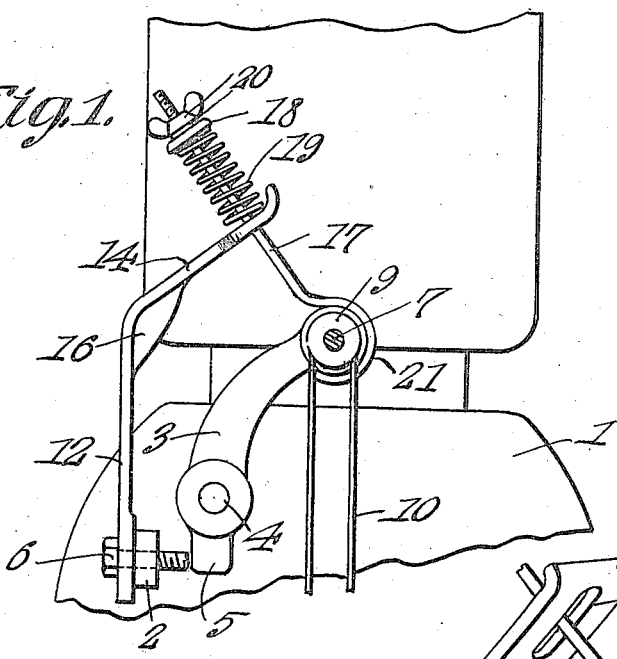
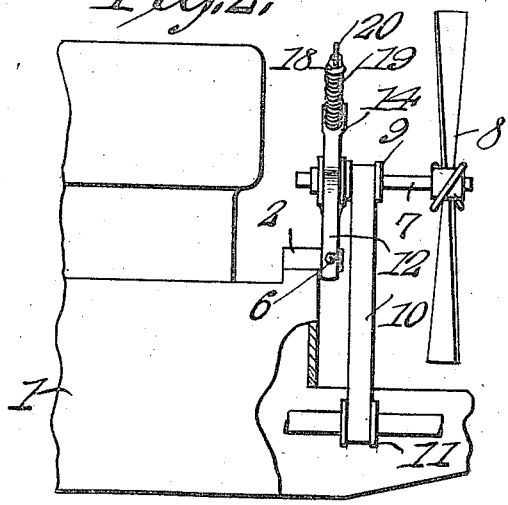
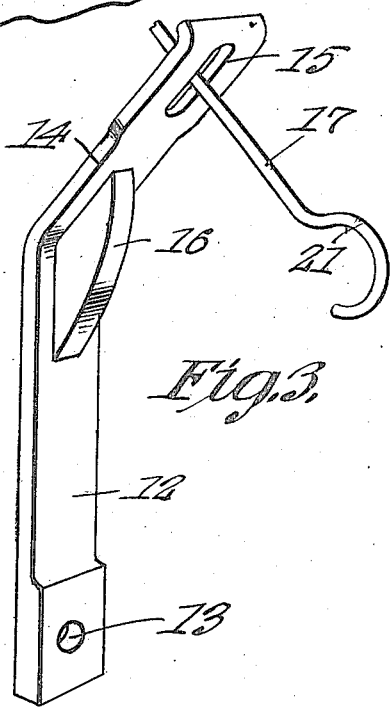
Witnesses
W. M. Reynolds
Inventor
by
Attorneys

UNITED STATES PATENT OFFICE.

WALTER M. REYNOLDS, OF HATTIESBURG, MISSISSIPPI.

AUTOMOBILE-FAN-BELT TIGHTENER.

1,238,822. Specification of Letters Patent. Patented Sept. 4, 1917.

Application filed September 7, 1916. Serial No. 118,922.

*To all whom it may concern:*

Be it known that I, WALTER M. REYNOLDS, a citizen of the United States, residing at Hattiesburg, in the county of Forest and State of Mississippi, have invented a new and useful Automobile-Fan-Belt Tightener, of which the following is a specification.

The present invention is a fan belt tightener for automobiles, and aims to provide a novel and improved device of that character adapted especially for use upon Ford automobiles to maintain the fan belt tightened, whereby the fan is operated properly under all conditions to cool the radiator and engine.

It is the object of the invention to provide an extremely simple and inexpensive device which can be readily attached to a Ford automobile without alterations or prohibitive trouble being involved, but which is nevertheless thoroughly efficient and practical in use to keep the fan belt under continuous yielding tension to assure of the utmost efficiency of the fan.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a front view of the engine of a Ford automobile, showing the attachment applied.

Fig. 2 is a side elevation illustrating the attachment.

Fig. 3 is a perspective view of the attachment, portions being broken away.

In the drawing, there is illustrated the crank case 1 of a Ford automobile, which is provided with a forwardly projecting lug 2 at one side. The fan bracket or crank 3 is pivoted, as at 4, to the forward end of the crank case, and is provided with an extension 5 adapted to bear against an adjusting screw or bolt 6 threaded through the lug 2, which is ordinarily used for tightening the belt, but which is more or less inefficient, since it does not provide for a yielding tension of the belt. The fan shaft 7 is journaled to the bracket 3, and carries the usual fan 8 and a pulley wheel 9 which is connected by a belt 10 to a pulley wheel 11 upon the crank shaft.

The present attachment embodies an upstanding flat bracket 12 in the form of a bar, and is provided at its upper end with a portion 14 extending at an obtuse angle and substantially parallel with the fan bracket 3 when in normal position. The lower end of the bracket 12 is provided with an aperture 13 for the reception of the screw or bolt 6, whereby said screw or bolt can be used for clamping the lower end of the bracket to the lug 2 for supporting the present attachment, with the upper end portion 14 of the bracket 12 overhanging the bracket 3. The free terminal of the portion 14 is provided with a longitudinal slot 15, and the bracket 12 is provided between its body portion and the portion or extension 14 with a strengthening web 16 located between the side edges of the bracket and terminating short of the slot 15.

A rod 17 is slidable through the slot 15 and has a washer 18 slidable thereon adjacent to that end remote from the bracket 3, and a coiled wire expansion spring 19 surrounds the rod 17 and is confined between the washer 18 and bracket 12 or the portion 14 thereof. A pair of jam nuts 20 are threaded upon the upper terminal of the rod 17 for holding the washer 18 in various adjusted positions, to regulate the tension of the spring 19. The lower terminal of the rod 17 is provided with a curved hook 21 extending through an arc of over 180 degrees to rotatably engage around the fan shaft bearing of the bracket 3, whereby said bracket seats in said hook.

The attachment can be readily applied, it simply being necessary to secure the bracket 12 to the lug 2 by the ordinary adjusting screw or bolt 6, and the rod 17 is then manipulated to engage the hook 21 with the bracket 3. The rod 17 will adjust itself in the slot 15 to a position practically perpendicular with the radius or straight line between the axes of the pivot 4 and fan shaft 7, thereby to assure of the best results. The spring 19 yieldably moves the rod 17 upwardly, whereby to swing the bracket 3 upwardly, and maintain the belt 10 under continuous yielding tension, to assure of the proper operation of the fan under all conditions.

Having thus described the invention, what is claimed as new is:

The combination with a lug, a bracket pivoted adjacent to said lug, and having a bearing at its free end, a shaft journaled in said bearing, a belt connected to the shaft, and an adjusting screw carried by the lug to limit the movement of said bracket, of an upstanding bracket secured to said lug by said screw, and having its upper portion extending at an obtuse angle and overhanging the first mentioned bracket, a rod slidable loosely through said overhanging portion and having a hook at one end rotatably embracing said bearing, an adjustable member upon the rod, and a spring between said adjustable member and overhanging portion to pull the first mentioned bracket toward said overhanging portion.

In testimony that I claim the foregoing as my own, I have hereto affixed my signature in the presence of two witnesses.

WALTER M. REYNOLDS.

Witnesses:
MONROE E. MILLER,
PHILOMENA A. ROCKELLI.

Copies of this patent may be obtained for five cents each, by addressing the "Commissioner of Patents, Washington, D. C."